(12) United States Patent
Wang et al.

(10) Patent No.: US 12,188,245 B2
(45) Date of Patent: Jan. 7, 2025

(54) CONSTRUCTION EQUIPMENT FOR A 3D WEAVING AND PRINTING INTEGRATED STRUCTURE

(71) Applicants: ZHEJIANG UNIVERSITY, Hangzhou (CN); XUZHOU JIANYAN INTELLIGENT CONSTRUCTION TECHNOLOGY CO., LTD, Xuzhou (CN)

(72) Inventors: Hailong Wang, Hangzhou (CN); Xiaoyan Sun, Hangzhou (CN); Zhennan Wu, Hangzhou (CN)

(73) Assignees: ZHEJIANG UNIVERSITY, Hangzhou (CN); XUZHOU JIANYAN INTELLIGENT CONSTRUCTION TECHNOLOGY CO., LTD, Xuzhou (CN)

( * ) Notice: Subject to any disclaimer, the term of this patent is extended or adjusted under 35 U.S.C. 154(b) by 0 days.

(21) Appl. No.: 18/039,277

(22) PCT Filed: Nov. 18, 2022

(86) PCT No.: PCT/CN2022/132726
§ 371 (c)(1),
(2) Date: Jun. 1, 2023

(87) PCT Pub. No.: WO2023/093619
PCT Pub. Date: Jun. 1, 2023

(65) Prior Publication Data
US 2024/0076886 A1    Mar. 7, 2024

(30) Foreign Application Priority Data
Nov. 25, 2021    (CN) .......................... 202111412981.7

(51) Int. Cl.
*E04G 21/04*    (2006.01)
*B28B 1/00*    (2006.01)
(Continued)

(52) U.S. Cl.
CPC .............. *E04G 21/04* (2013.01); *B28B 1/001* (2013.01); *B33Y 10/00* (2014.12); *B33Y 30/00* (2014.12); *B33Y 70/10* (2020.01); *B33Y 50/02* (2014.12)

(58) Field of Classification Search
None
See application file for complete search history.

(56) References Cited

U.S. PATENT DOCUMENTS

| 2020/0149269 A1 | 5/2020 | Crump et al. |
| 2021/0122111 A1 | 4/2021 | Almousa et al. |

(Continued)

FOREIGN PATENT DOCUMENTS

| CN | 106393684 | 2/2017 |
| CN | 107553934 | 1/2018 |

(Continued)

OTHER PUBLICATIONS

Wang Hailong et al. "Bonding performance between steel wire rope and 3D printed cemented-based composites" Journal of Building Structures, vol. 42, No. 6 (2021).

(Continued)

*Primary Examiner* — Seyed Masoud Malekzadeh
*Assistant Examiner* — Xinwen Ye
(74) *Attorney, Agent, or Firm* — Jiwen Chen; Joywin IP Law PLLC

(57) ABSTRACT

The present invention discloses a 3D weaving and printing integrated structure construction equipment including: a printing matrix material preparation device, processing the printing matrix raw materials and then delivering them to a (Continued)

printing matrix extrusion device; a printing matrix extrusion device, having the functions of promoting extrusion and lamination molding, and printing a matrix; a wire pushing and spatial anchoring device, using a nail-shooting to position and tow a rope/wire/cable for continuously weaving layer by layer stacking along the vertical direction; an electromagnetic guided shuttle dropping device, weaving the rope wire/cable material along the longitude and latitude directions; a locking device, positioning and fixing the rope/wire/cable woven along the longitude and latitude directions; a tensioning traction device, performing spatial multi-directional prestress tensioning on the rope/wire/cable woven along the longitude and latitude directions.

6 Claims, 3 Drawing Sheets

(51) Int. Cl.
*B33Y 10/00* (2015.01)
*B33Y 30/00* (2015.01)
*B33Y 50/02* (2015.01)
*B33Y 70/10* (2020.01)

(56) References Cited

U.S. PATENT DOCUMENTS

2021/0340756 A1* 11/2021 Sun ................. B33Y 10/00
2022/0356611 A1* 11/2022 Laine ................ D03D 41/008

FOREIGN PATENT DOCUMENTS

| | | |
|---|---|---|
| CN | 107856298 | 3/2018 |
| CN | 109129827 | 1/2019 |
| CN | 109227875 | 1/2019 |
| CN | 110774407 | 2/2020 |
| CN | 112709443 | 4/2021 |
| CN | 114353432 | 4/2022 |
| WO | WO-2021119224 A1 * | 6/2021 ............. B29C 70/22 |

OTHER PUBLICATIONS

Sun Xiaoyan et al. "Bond performance between BFRP bars and 3D printed concrete", Construction & Building Materials, vol. 269, Feb. 1, 2021.

* cited by examiner

CONSTRUCTION EQUIPMENT FOR A 3D WEAVING AND PRINTING INTEGRATED STRUCTURE

This is a U.S. national stage application of PCT Application No. PCT/CN2022/132726 under 35 U.S.C. 371, filed Nov. 18, 2022 in Chinese, claiming priority of Chinese Application No. 202111412981.7, filed Nov. 25, 2021, all of which are hereby incorporated by reference.

TECHNICAL FIELD

The present invention relates to the technical fields of architectural structure, structural space shape optimization, structural design and construction, etc, in particular to a construction equipment for a 3D weaving and printing integrated structure.

DESCRIPTION OF RELATED ART

As a rapid prototyping and additive manufacturing technology, 3D printing has been rapidly and widely promoted in various industries since its invention. 3D printing buildings can effectively reduce construction waste, improve construction efficiency, shorten construction period, reduce labor, improve mechanization level, achieve energy conservation and emission reduction on the whole, and contribute to environmental improvement. In addition, because 3D printing can be controlled by a computer to achieve arbitrary spatial modeling design, it can combine structural forces with architectural aesthetics, and reflect the artistry of the building. In January 2013, the Netherlands used 3D printed concrete to build a house in shape of Mobius strip. In January of the same year, the European Space Agency was developing a construction technology for a 3D printing space station using lunar soil and other materials. In January of the same year, China completed the printing of temporary facilities in Shanghai using high-grade cement, glass fiber, and some additives, and attempted to assemble a multi-layer structure through 3D printing components. In February 2013, the UK implemented a rapid assembly and construction technology for fiber nylon 3D printing into structures. In 2015, China printed a small multi-storey building structure in Suzhou using plastic, magnesium based adhesives, gypsum, glass fiber, and cement. Due to the urgent need to improve the strength and durability of existing printing materials, the current 3D printing technology also lacks the combination form of matrix and traditional reinforcement materials, such as steel bars, resulting in the printing structure types being limited material performance, mostly small-scale civil buildings with small spaces and small spans.

The existing 3D building materials are very rich. CN107603162A discloses a high strength and toughness 3D printing material for construction. CN107619230A discloses a concrete material for 3D printing, CN107200536A discloses a rapid prototyping 3D printing paste for construction and a preparation method thereof, CN107177155A discloses a high-strength UV resistant 3D printing material for the construction field and a preparation method thereof, and CN107141799A discloses an oxidation resistant and high-strength 3D printing material for construction engineering and a preparation method thereof, CN107417180A discloses a graphene geopolymer cement and a preparation method thereof, and CN107032669A discloses a 3D printing construction material. Currently, the type and strength of printing materials have significantly improved. The additive self-made 3D printing matrix does not require a mold, but most of them are brittle materials with low strength, and need to be reinforced with a flexible, high-strength, and geometrically variable high-strength material and form a strong spatial network, so as to ensure the bearing capacity, deformation capacity, and durability of the structure under various operating conditions.

In November 2015, Beijing Nashengtong (NST) New Material Technology Co., Ltd., Beijing Institute of Thermoplastic Composites Engineering Technology, and the Carbon Fiber Composite Innovation Center developed a new type of ultra-lightweight, high-strength, high-temperature resistant, wear-resistant, and corrosion-resistant industrial grade 3D printed carbon fiber reinforced nanocomposites. Due to the high price of carbon fiber materials, they are mostly used in the aerospace and precision industries, and a large proportion of them are still not practical for building structures. In 2008, Zhang Zhichun proposed the use of composite FRP reinforcement with embedded steel wires, steel and FRP have also opened a variety of combination forms and material preparation processes. Currently, there are production capacity with various specification high-strength steel wire strands, steel-FRP composite wires, and nano high-strength composite wires. Existing construction steel and composite fiber materials are mostly manufactured in the form of reinforcement, requiring cutting, binding, and positioning according to design to form a rigid skeleton, the construction process is complex and difficult to integrate with existing 3D printing technology.

How to use existing 3D printing technology and existing cementitious materials to combine with high strength and toughness composite materials to manufacture new building structures is a key issue at this stage. At this stage, various technological attempts have been made to combine the advantages of 3D printing with traditional steel materials. CN106760532A has announced a building construction method based on 3D printing, and CN105756187A has announced a building construction and construction method that combines 3D printing technology with concrete. These methods utilize the molding capabilities of the 3D printing process to print the shell or main support, and then use the traditional steel skeleton manufacturing mode to construct ordinary concrete buildings. By printing the matrix first, cutting the reinforcement, binding, positioning and lifting, and finally pouring ordinary concrete into the 3D template, the two are assembled. The existing combined assembly 3D construction method only utilizes 3D printing technology to save template engineering, and does not fully utilize 3D printing technology to form an integrated and automated intelligent construction technology. Our research group proposed a spatial fastening method for 3D printed concrete structures in CN111015891A, which can solve the problem of spatial reinforcement and reinforcement of rigid reinforcement materials in 3D printed concrete matrixs. CN108708455A proposes an integrated construction device and method for 3D printing FRP reinforced concrete structures, which uses a gear device to extrude and soften FRP materials, thermoplastic them into reinforcement, solidify them into reinforcement during the concrete printing process, and establish an integrated construction technology combined with concrete printing. However, due to the thermal stress generated by the hot processing of reinforcement and cold processing printing process of concrete, it is easy to crack, and the FRP reinforcement has no prestress, which enhances concrete in the form of bonding, resulting in low efficiency in improving structural performance. In order to solve the problem of difficult spatial adaptation of reinforcement and printing matrix additive manufacturing processes, our research group proposed a construction method a construction method of spatial aggregate reinforced 3D printing concrete structures in CN 110774407B, CN1107407A discloses a construction method of 3D printing and weaving integrated molding buildings, CN109129818B discloses a construction method of 3D printing and weaving integrated composite beam, and composite beam, CN109304788B discloses a construction method of 3D printing and weaving integrated composite plate, and CN109129827B discloses a construction method of 3D printing and weaving integrated composite column. Technical verification and series of attempts have been made on the printing and weaving structure from the aspects of materials, components, and reinforcement construction methods. The research paper is titled «Bonding performance between steel wire rope and 3D printed cement-based composites» and «Bond performance between steel wire and 3D printed cement-based composites» have achieved excellent experimental results, and have been published in domestic and foreign journals such as «Journal of Building Structures», «Construction and Building Materials».

Due to the technical bottlenecks of existing 3D printing and its construction equipment technology, such as a narrow range of product applications, processes that are not suitable for construction engineering, low efficiency of reinforcement materials for printing matrixs, etc. How to integrate additive manufacturing technology and spatial weaving technology to provide an integrated intelligent additive construction equipment for engineering buildings is an urgent technical issue to be addressed currently.

SUMMARY OF THE INVENTION

The purpose of the present invention is to provide a 3D weaving and printing integrated structure construction equipment, the equipment can achieve the integration of wire weaving into the printing matrix to form a strong and tough spatial structure.

The present invention provides the following technical solutions:

A 3D weaving and printing integrated structure construction equipment, the equipment comprising:

A printing matrix material preparation device, processing the printing matrix raw materials and then delivering them to a printing matrix extrusion device;

A printing matrix extrusion device, having the functions of promoting extrusion and lamination molding, and printing a matrix;

A wire pushing and spatial anchoring device, using a nail-shooting to position and tow a rope/wire/cable for continuously weaving layer by layer in the vertical direction;

An electromagnetic guided shuttle dropping device, weaving the rope wire/cable material along the longitude and latitude directions;

A locking device, positioning and fixing the rope/wire/cable woven along the longitude and latitude directions;

A tensioning traction device, performing spatial multi-directional prestress tensioning on the rope/wire/cable woven along the longitude and latitude directions.

The 3D weaving and printing integrated structure construction equipment also includes an equipment bracket, which can be selected, but not limited to, a planar rectangular coordinate system bracket, which can achieve the tensioning of multi-directional high-strength wire, the pushing of the printing matrix extrusion device, and the positioning support of the weaving of the electromagnetic guided shuttle dropping device.

The wire pushing and spatial anchoring device comprises a drive wire shaft, a driven wire shaft, and a nail-shooting storehouse. The drive wire shaft and the driven wire shaft constitute a rotating wheel group that mechanically drives the pushing of the rope/wire/cable. The drive wire shaft simultaneously serves as a multi-point ejection turntable, driving the wire into the nail-shooting storehouse to connect with a anchor nail, and then continuously weaving the rope/wire/cable into the printing matrix layer by layer in the vertical direction.

The anchor nail is provided with a penetration hole at one end and an inverted umbrella anchor at the other end, wherein the inverted umbrella anchor is connected to the nail through an anchor ring. The drive wire shaft drives the driven wire shaft (steel ring) to push the rope/wire/cable into the nail-shooting storehouse, and the rope/wire/cable penetrates the penetration hole, a shooting firing button pushes the anchor ring to snap open the inverted umbrella anchor, the wire and the nail are continuously woven into the printing matrix in the vertical direction.

The electromagnetic guided shuttle dropping device includes a shuttle seat, a spring pressing device, a bobbin, a bearing, and a electromagnetic shuttle. The shuttle seat receives the shuttle and controls the spring pressing device to press the electromagnetic shuttle with a bobbin of rope/wire/cable on the bearing, weaving the rope wire/cable material along the longitude and latitude directions.

The spring pressing device at the rear of the shuttle seat is pressed using hydraulic power input.

For rope/wire/cable along the longitude and latitude directions, progressive sleeves are used, effective locking is achieved through the locking device, and positioning and fixation are achieved through rotating ball joints and universal damping joint balls at the angles required by structural forces through screw threads.

The printing matrix raw materials are 3D printing materials, which have the characteristics of rapid prototyping and convenient construction compared to ordinary building materials. It includes cement based materials, gypsum materials, resin materials, plastics, nylon materials, and composite reinforcement components, the composite reinforcement portion comprising fibers, polymers, expanded microspheres, or hollow particles.

The rope/wire/cable is selected from steel wire, steel strand, fiber composite wire, or nanowire. The rope/wire/cable is lightweight and high-strength, geometrically variable, twisted and woven by multiple strands of rope, has a high surface friction coefficient, and integrated molding with the matrix to coordinate working, ensure the mechanical properties, fatigue performance, and durability of a new type of strong and ductile structure.

The tensioning traction device is rigidly connected to the equipment bracket through bolts.

The equipment provided by the present invention can replace the template engineering, reinforcement cage binding process, and prestress tensioning process in traditional building construction during the construction process of 3D weaving and printing integrated structure. Spatial multi-directional prestress tensioning is used to ensure the mechanical performance, seismic performance, fatigue performance, and durability of a new type of strong and ductile structure. Conducting topological optimization analysis for spatial shapes based on structural working state, determining spatial structural forms and printing and weaving processes, and achieving three-dimensional positioning and spatial weaving of reinforced wire/rope/cable by positioning and spraying special inverted umbrella anchor screws during the 3D printing of the structure, ensuring accurate construction and stress safety of the integrated structure, making the structural modeling more reasonable, and the design implemented accurately. During the printing and weaving process, the electromagnetic guided shuttle dropping device and the locking device are used, which can adapt to the spatial weaving tension interlocking of materials with various modulus and surface morphology. During the printing and weaving process, spatial tensioning and numerical control devices are used to apply prestress tension to the spatial multi-directional weaving wire/rope/cable, ensuring the reinforcement and reinforcement efficiency of the woven wire on the printing matrix. The surface of the wire/rope/cable can be roughened and patterned to increase friction, then initial prestress tensioning and weaving can be used to ensure reinforcement efficiency. Smooth coating can also be used for non adhesive tensioning and anchoring. After the printing matrix has hardened, higher prestress can be applied to fully utilize the properties of high-strength materials. This construction equipment for printing matrix and spatial weaving multi material adopts, but is not limited to, the form of frame structure construction. It can be combined with existing traditional reinforcement materials for binding and construction, spatial weaving mesh reinforcement can be used in conjunction with traditional reinforcement methods for stress bearing, and it can also print and weave construction structures and components separately, so it has good applicability and compatibility.

The 3D weaving and printing integrated structure construction equipment provided by the present invention also includes a control system that can perform positioning control, power control, electromagnetic control, and mechanical control. The control system can achieve positioning and pushing of the printing matrix according to the structural design and construction process, positioning and configuration of reinforcement wire/rope/cable, positioning nail-shooting to anchor, directional tensioning of wire, and positioning and guiding of a shuttle; quantitative control of nail-shooting, quantitative control of shuttle ejection, and quantitative control of tensioning; electromagnetic signal control guides the shuttle, mechanically controlling the direction of printing, weaving, and spatial tensioning.

In view of the insufficient strength and toughness of the existing 3D printing material matrix, which makes it difficult for the structure to break through the limitations of spatial span and bearing capacity, the present invention combines the technical advantages of the existing 3D printing material rapid prototyping with the superior material performance of high-strength wire, which is lightweight, high-strength, and geometrically variable, thus a new type of architectural structure with integrated molding is formed by weaving a certain proportion of high-strength wire into 3D printing matrix to improve the insufficient strength and toughness, which is different from traditional reinforced concrete structures. This not only solves the performance defects of the existing 3D printing matrix, but also improve the spatial spanning capability of the structure. It is convenient for construction, fast and applicable, and has advantages such as high toughness, fatigue resistance, and long life.

The present invention integrates additive manufacturing technology and spatial weaving technology on the basis of existing technology, aiming at collaborative construction and enhancing efficiency of printing process, printing matrix materials, and high-strength wire materials, and proposes a technology and equipment implementation scheme for spatial positioning, effective anchoring, and prestress tensioning of spatial weaving wire/rope/cable while additive manufacturing printing matrix, the present invention solves the lack of equipment technology in intelligent manufacturing in the field of civil engineering technology in China, and provides a hardware foundation for intelligent additive construction technology for integrated engineering buildings.

Due to the adoption of the above technical scheme, the present invention has the following beneficial effects:

1. Using the 3D printing matrix replace traditional concrete, using high-strength wire instead of traditional reinforcement, and using spatial printing weaving molding technology replace traditional building structure construction technology to form a spatial bearing system, not only simplifying building construction procedures, reducing labor intensity, but also enriching structure modeling.

2. Using the numerical control technology to achieve the 3D weaving and printing integrated structure construction, improving the level of digital and intelligent integration of structure construction, saving construction time, reducing material consumption and semi-finished product processing, and reducing carbon emissions from the production and construction of building structures.

3. The printing matrix can either use existing traditional cement-based building materials, or choose materials such as polymer materials, gypsum materials, and other materials with more sophisticated modeling to achieve integrated construction of structure construction and structure decoration. The surface of the high-strength wire/rope/cable can be roughened and patterned to increase friction, then initial prestress tensioning and weaving can be used to ensure reinforcement efficiency. Smooth coating can also be used for non adhesive tensioning and anchoring. After the printing matrix has hardened, higher prestress can be applied to fully utilize the properties of high-strength materials. The flexible woven reinforcement form of high-strength wire can be either self-contained or designed and constructed in combination with existing reinforcement materials, effectively improving the tensile, shear, wear, and crack resistance of the 3D printing matrix, greatly enhancing the fracture toughness and impact resistance of the structure, improving the fatigue performance and durability of the structure, and fully highlighting the advantages of 3D printing buildings, which are no longer limited to small scale building structures.

4. Adopting structure shape and spatial optimization design, reasonably selecting structure form, integrating high-strength wire into the printing matrix through spatial positioning to form a strong and flexible spatial structure, enabling various parts of the building to meet different requirements of structural mechanics, as well as achieve economic aesthetics and plastic arts under the premise of safety and reliability.

5. Large spatial and complex structures can be individually printed and woven in different parts, and then assembled into a whole. Preset mortise and tenon components and post tensioned prestressing techniques are used to enhance the integrity. The combination of this new strong and flexible structure with traditional architectural structures has flexible compatibility and universality.

Among them, 1. A printing matrix material preparation device, 2. A rope/wire/cable in the vertical direction, 3. A printing matrix extrusion device, 4. An anchor nail, 5. A penetration hole, 6. An anchor pushing ring, 7. An inverted umbrella anchor, 8. Rope/wire/cable drive wire shaft and multi-point ejection turntable, 9. A nail-shooting storehouse, 10. A nail firing button, 11. A driven wire shaft: steel ring, 12. A printing and weaving structure, 13. Multiple tension channels, 14. A tension traction device, 15. A rotating ball joint, 16. A locking device, 17. A progressive sleeve, 18. An universal damping joint ball, 19. A thread, 20. Hydraulic input, 21. Tensioning digital display, 22. High pressure rubber hose, 23. Hydraulic pump, 24. An electromagnetic guided shuttle dropping device, 25. Hydraulic power input, 26. A screw thread, 27. A shuttle seat, 28. An Electromagnetic shuttle, 29. A bearing, 30. Rope/wire/cable along the longitude and latitude directions, 31. A spring pressing device.

DETAILED DESCRIPTION OF THE INVENTION

The preferred embodiments of the present invention are described below, and those skilled in the art will be able to implement them using relevant techniques in the field according to the following descriptions, and will be able to better understand the innovations and benefits of the invention.

Figure 1:
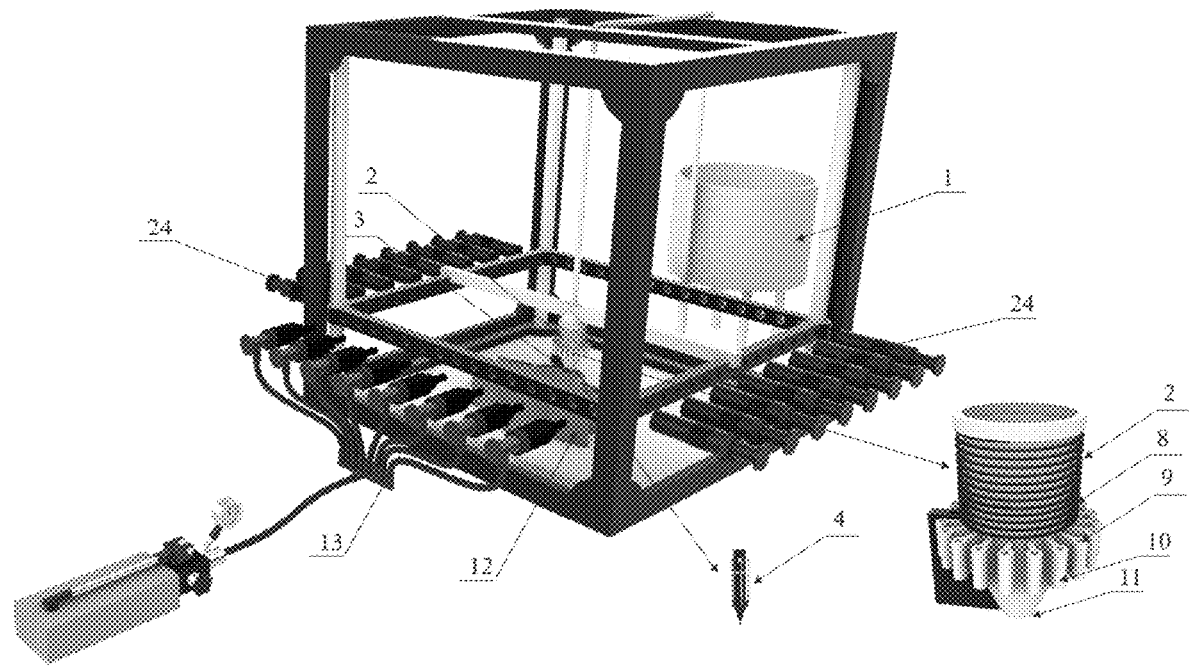
FIG. 1 is a detailed drawing of the equipment of the present invention.
Figure 2:
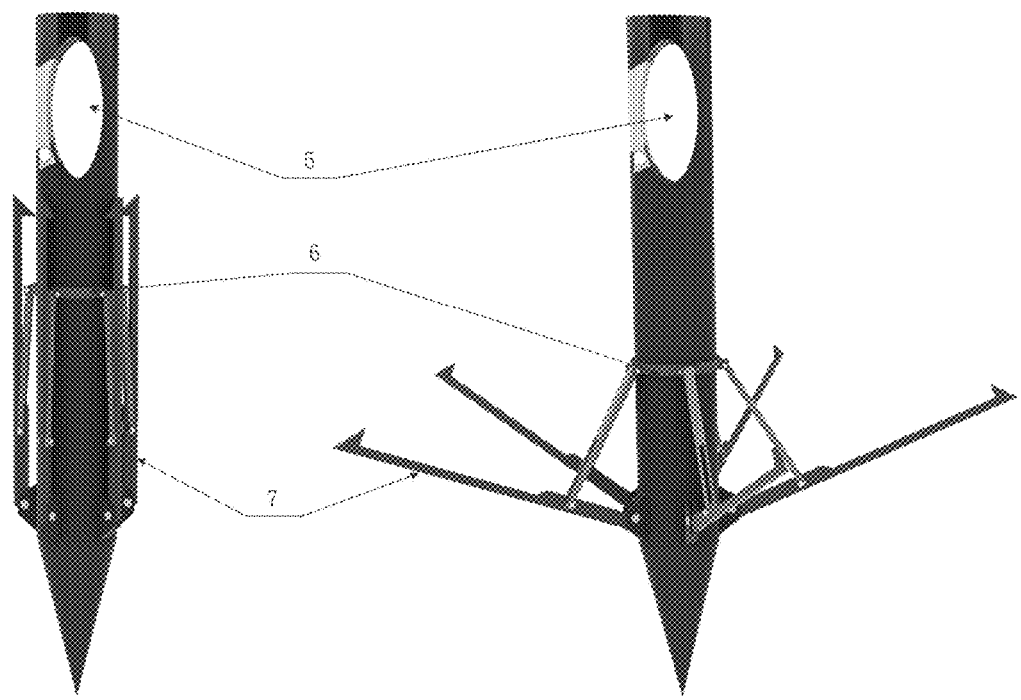
FIG. 2 is a detailed drawing of wire spatial anchor nail-shooting.
Figure 3:
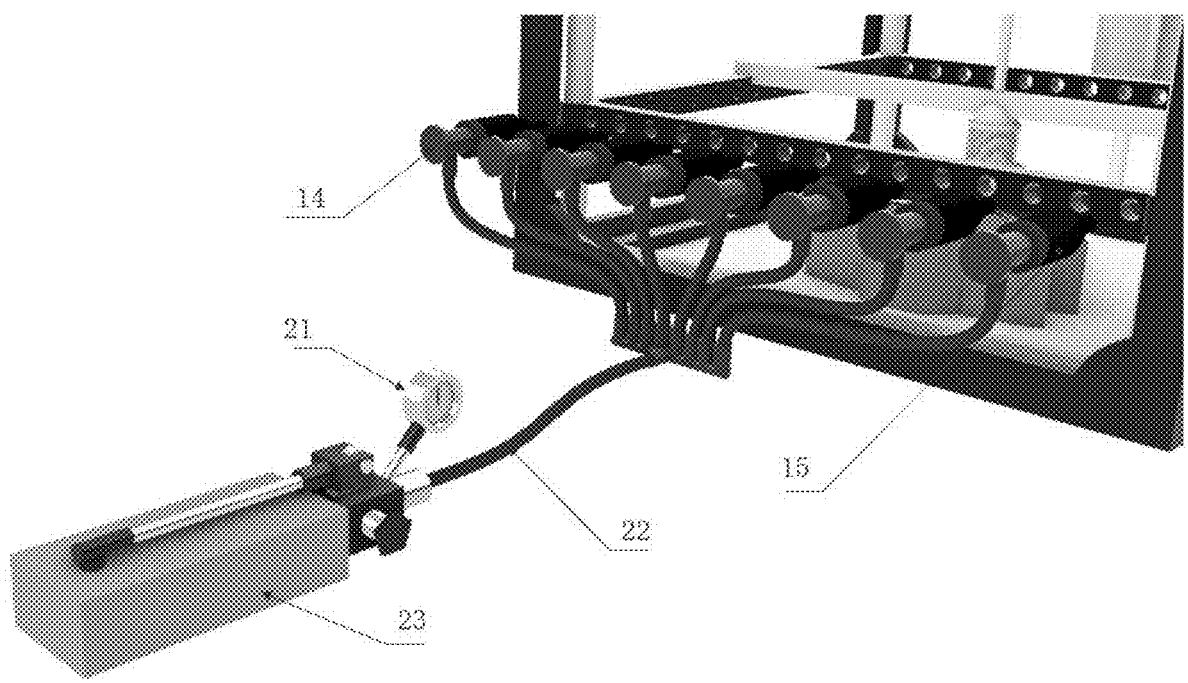
FIG. 3 is a detailed drawing of wire tension.
Figure 4:
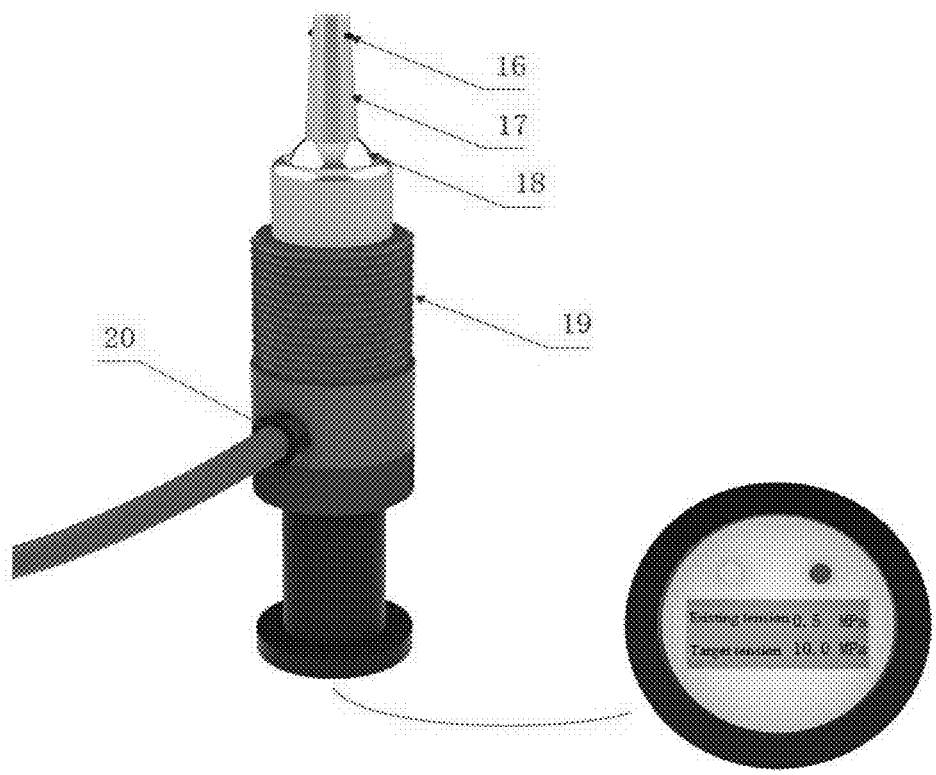
FIG. 4 is a detailed drawing of wire spatial weaving and traction.
Figure 5:
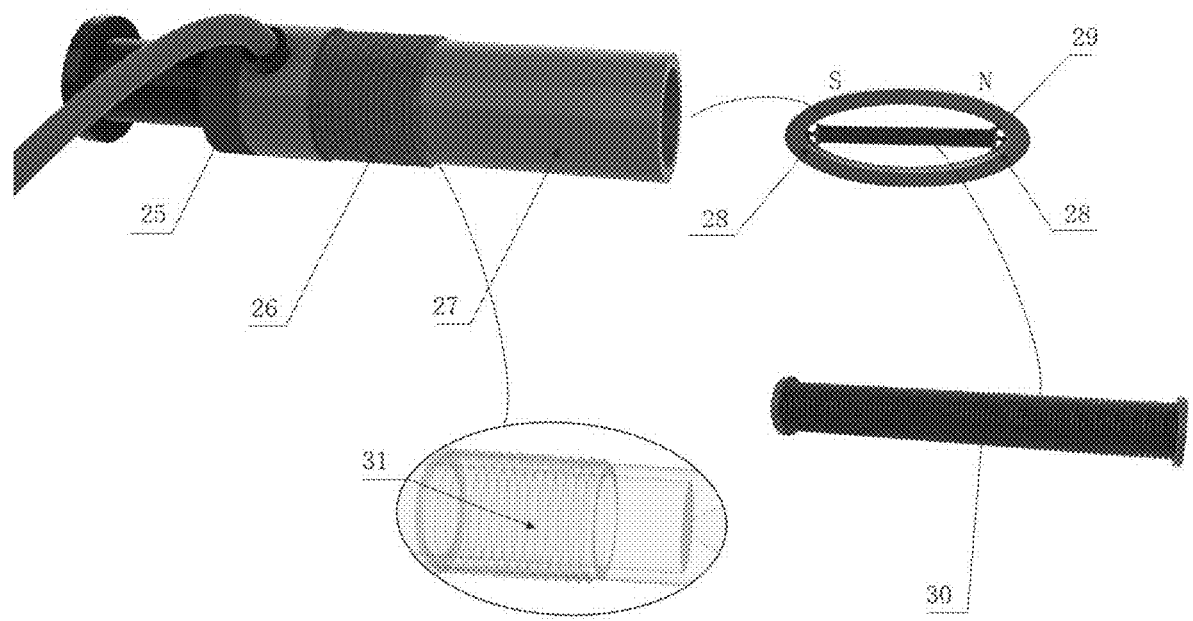
FIG. 5 is a detailed drawing of wire spatial weaving electromagnetic guided shuttle dropping.

As shown in FIGS. 1-5, the 3D printing and weaving integrated construction equipment used in the present invention includes: a printing matrix material preparation device 1, a spatially movable printing matrix extrusion device 3 and a wire pushing and spatial anchoring device 4 arranged on an equipment bracket, a tensioning traction device 14 fixed on the equipment bracket, and an electromagnetic guided shuttle dropping device 24.

The method of use is:

1. Printing the matrix and weaving the rope/thread/cable in the vertical direction.

(1) Using the printing matrix material preparation device 1 prepare the printing matrix material and then deliver them to the printing matrix extrusion device 3.

(2) Due to the structural optimization design of 3D printing buildings, the spatial weaving reinforcement design is carried out in different parts, stages, and working conditions. For the printing process and weaving process, the printing substrate matrix extrusion device 3 is used to laminating produce the main body of the building.

(3) Using the wheel shaft to rotate the wire/rope/cable 2 in the vertical direction and to be weaved into the matrix, the specific method is as follows: using the drive wire shaft and the multi-point ejection turntable 8 to drive the driven wire shaft steel ring 11 to guide the wire/rope/cable in the vertical direction through the penetration hole 5 in the tail of the nail-shooting storehouse 9, and using the anchor nail 4 to position and launch, using the nail-shooting firing button 10 to push the anchor ring 6, and snapping open the inverted umbrella anchor 7, realizing the positioning, weaving, and anchoring of the wire/rope/cable 2 in the vertical direction in the printing matrix.

2. Using Space Shuttle Weaving Technology for Space Stereoscopic Weaving of Wire/Rope/Rope In this step, the electromagnetic guided shuttle dropping device 24, the hydraulic tensioning device 14, and the locking device 16 are used to perform space weaving of rope/thread/cable material along the longitude and latitude directions. Specifically:

(1) Weaving rope/wire/cable along the longitude and latitude directions: the electromagnetic guided shuttle dropping device 24 is fixed in the positioning hole of the equipment bracket through the screw thread 26, the hydraulic power input 25 is used to compress the rear spring of the shuttle seat 27, the control of the electromagnetic shuttle 28 with the high-strength rope/wire/cable 30 spool along the longitude and latitude direction is achieved by pressure injection bearing 29, the shuttle seat 27 is used to receive the shuttle and activate the spring pressing device 31 for secondary pressure injection, achieving complex spatial stereoscopic weaving.

(2) Locking and tensioning: the progressive sleeve 17 adapted to high-strength wire/rope/cable materials with various modulus and surface shapes is used for effective locking through the locking device 16, the rotating ball joint 15 and the universal damping joint ball 18 are positioned and fixed through the screw thread 19 at the angle required by the structural stress, the universal numerical control hydraulic tensioning 14 is used through the hydraulic input 20, the tensioning digital display 21, and the high pressure rubber hose 22, the hydraulic pump 23 performs prestress tensioning on the spatial weaving high-strength wire/rope/cable material in stages and conditions. After the printing matrix reaches the predetermined strength, tensioning the high-strength rope/wire/cable to maintain the long-term service performance of the structure with the permanent inverted umbrella anchor 4, ensuring the three-dimensional prestressed weaving of the high-strength wire/rope/cable, and improving the structural reinforcement efficiency and the integrated technical level of intelligent construction.

The steps of the intelligent construction method for printing and weaving integrated of the equipment are as follows:

Step 1. Based on mechanical and collaborative properties of the printing matrix and reinforcement materials, as well as anisotropy of the macroscopic properties after molding, an improved evolutionary optimization algorithm is used to optimize the spatial topology of the structure and determine a three-dimensional digital design model of the building.

Step 2. Referring to «Code for Design of Concrete Structures GB50010-2010», «Technical specification for precast monolithic welded steel mesh composite concrete structure TCECS_579-2019», «Technical Specification for 3D Printing of Concrete T/CECS 786-2020». According to the differences between the printing matrix material and traditional concrete material, the differences between the rope/wire/cable and traditional reinforcement material, and the differences between the printing and weaving process characteristics and traditional structural construction, the 3D digital model of the structure is designed for the printing and weaving process, and specific printing and weaving parameters such as weaving density, weaving positioning nodes, tensioning quantity, tensioning angle, and tensioning stress are determined; dynamic control, mechanical control, and electromagnetic control parameters are set, an integrated construction process of printing and weaving is determined.

Step 3. The aggregates, admixtures, and additives are metered and mixed according to the preset mix ratio and process flow, the printing matrix material preparation device 1 is used to prepare material of the printing matrix, and the prepared 3D printing substrate raw materials are positioned and stacked for molding through the printing smatrix extrusion device 3.

(4) During the printing process, the rope/wire/cable in the vertical direction is weaving integrated in a pre-designed parallel printing direction, the nail-shooting 4 is used to position to ensure geometric weaving shape in key turning point, the nail-shooting is used to position and tow the rope/wire/cable for layer by layer stacking in the vertical direction. The longitude and latitude interlaced weaving adopts the electromagnetic guided shuttle dropping device 24 to form a spatial grid. According to the structural stress and deformation design, the tensioning traction device 14 is used to carry out spatial multi-directional prestress tensioning on the rope/wire/cable along the longitude and latitude directions, forming a spatial three-dimensional woven structure. Thereby realizing the integrated rapid hardening molding and high-strength construction of high-strength wire/rope/cable woven integrated printing structure.

For the present invention, it is also possible to print and weave the entire structure 12 as a whole, or to print components first and connect them through wires/ropes/cables to form an integral structure. The surface of the wires/ropes/cables can be roughened and patterned to increase friction, then initial prestress tensioning and weaving can be used to ensure reinforcement efficiency. Smooth coating can also be used for non adhesive tensioning and anchoring. After the printing matrix has hardened, higher prestress can be applied to fully utilize the properties of high-strength materials.

The invention claimed is:

1. A construction method by using a 3D weaving and printing integrated structure construction equipment, the construction method comprising:

(1) based on mechanical and collaborative properties of printing matrix and reinforcement materials, as well as anisotropy of macroscopic properties thereof after molding, using an algorithm to optimize a spatial topology of a structure and determine a three-dimensional digital design model of a building;

(2) according to differences between a printing matrix material and a traditional concrete material, differences between a rope/wire/cable and traditional reinforcement material, and differences between printing and weaving process characteristics and traditional structural construction, designing a 3D digital model of the structure for a printing and weaving process, and determining specific printing and weaving parameters including weaving density, weaving positioning nodes, tensioning quantity, tensioning angle, and tensioning stress; setting dynamic control, mechanical control, and electromagnetic control parameters, determining an integrated construction process of printing and weaving;

(3) metering and mixing aggregates, admixtures, and additives according to a preset mix ratio and process flow, using a printing matrix material preparation device to prepare the printing matrix material, and positioning and stacking prepared 3D printing matrix raw materials for molding through a printing matrix extrusion device; and (4) during the printing process, a wire pushing and spatial anchoring device using a nail to position and tow the rope/wire/cable in a pre-designed parallel printing direction for continuously weaving integrated in a vertical direction, an electromagnetic guided shuttle dropping device forming a ray/rope/cable to a spatial grid through staggered weaving along longitude and latitude directions; according to the structural stress and deformation design, using a tensioning traction device to carry out spatial multi-directional prestress tensioning on the rope/wire/cable along the longitude and latitude directions, forming a spatial three-dimensional woven structure;

wherein the 3D weaving and printing integrated structure construction equipment comprises:

the printing matrix material preparation device, processing the printing matrix raw materials and then delivering them to the printing matrix extrusion device;

the printing matrix extrusion device, having the functions of promoting extrusion and lamination molding, and printing matrix;

the wire pushing and spatial anchoring device, using the nail to position and tow the rope/wire/cable for continuously weaving to the matrix layer by layer in the vertical direction;

the electromagnetic guided shuttle dropping device, weaving the rope/wire/cable material along the longitude and latitude directions;

a locking device, positioning and fixing the rope/wire/cable woven along the longitude and latitude directions; and the tensioning traction device, performing spatial multi-directional prestress tensioning on the rope/wire/cable woven along the longitude and latitude directions;

wherein, the wire pushing and spatial anchoring device comprises a drive wire shaft, a driven wire shaft, and a nail-shooting storehouse, the drive wire shaft and the driven wire shaft constitute a rotating wheel group that mechanically drives the pushing of the rope/wire/cable, the drive wire shaft simultaneously serves as a multi-point ejection turntable, driving the wire into the nail-shooting storehouse to connect with an anchor nail, and then continuously weaving the rope/wire/cable into the printing matrix layer by layer in the vertical direction.

2. The construction method according to claim 1, wherein, the anchor nail is provided with a penetration hole at one end and an inverted umbrella anchor at the other end, wherein the inverted umbrella anchor is connected to the nail through an anchor ring, the drive wire shaft drives the driven wire shaft to push the rope/wire/cable into the nail-shooting storehouse, and the rope/wire/cable penetrates the penetration hole, a nail firing button pushes the anchor ring to snap open the inverted umbrella anchor, the wire and the nail are continuously woven into the printing matrix layer by layer in the vertical direction.

3. The construction method according to claim 1, wherein, the electromagnetic guided shuttle dropping device includes a shuttle seat, a spring pressing device, a bobbin, a bearing, and an electromagnetic shuttle; the shuttle seat receives the electromagnetic shuttle and controls the spring pressing device to press the electromagnetic shuttle with a bobbin of rope/wire/cable on the bearing, weaving the rope wire/cable material along the longitude and latitude directions.

4. The construction method according to claim 1, wherein, for the rope/wire/cable along the longitude and latitude directions, progressive sleeves are used, effective interlocking is achieved through the locking device, and positioning and fixation are achieved through rotating ball joints and universal damping joint balls at the angles required by structural forces through threads.

5. The construction method according to claim 1, wherein, the printing matrix raw materials include cement based materials, gypsum materials, resin materials, plastics, nylon materials, and composite reinforcement components, and wherein the composite reinforcement components comprise fibers, polymers, expanded microspheres, or hollow particles.

6. The construction method according to claim 1, wherein, the rope/wire/cable is selected from steel wire, steel strand, fiber composite wire, or nanowire.

\* \* \* \* \*